United States Patent
Pettit et al.

(10) Patent No.: US 7,270,901 B2
(45) Date of Patent: Sep. 18, 2007

(54) COMBINED AUTOTHERMAL/STEAM REFORMING FUEL PROCESSOR MECHANIZATION

(75) Inventors: William H Pettit, Rochester, NY (US); Gerald Voecks, Fairport, NY (US); Rodney L Borup, Los Alamos, NM (US)

(73) Assignee: General Motors Corporation, Detroit, MI (US)

( * ) Notice: Subject to any disclaimer, the term of this patent is extended or adjusted under 35 U.S.C. 154(b) by 584 days.

(21) Appl. No.: 10/666,052

(22) Filed: Sep. 17, 2003

(65) Prior Publication Data

US 2004/0053086 A1    Mar. 18, 2004

Related U.S. Application Data

(63) Continuation-in-part of application No. 10/044,335, filed on Jan. 11, 2002, now Pat. No. 6,783,879.

(51) Int. Cl.
  H01M 8/06    (2006.01)
  H01M 8/04    (2006.01)
  B01J 8/00    (2006.01)

(52) U.S. Cl. .......................... 429/19; 429/20; 429/22; 422/105; 422/188; 422/196

(58) Field of Classification Search .............. 429/17, 429/19, 20, 22; 422/105, 188, 196, 197
See application file for complete search history.

(56) References Cited

U.S. PATENT DOCUMENTS

| | | | |
|---|---|---|---|
| 4,002,805 A | | 1/1977 | Waldman ................... 429/17 |
| 4,485,070 A | * | 11/1984 | Funk et al. .............. 422/110 X |
| 4,642,273 A | | 2/1987 | Sasaki ......................... 429/25 |
| 5,334,463 A | | 8/1994 | Tajima et al. ................. 429/9 |
| 5,523,483 A | * | 6/1996 | Singh et al. ................... 564/68 |
| 5,766,786 A | | 6/1998 | Fleck et al. ................... 429/17 |
| 5,981,096 A | | 11/1999 | Hornburg et al. .............. 429/17 |
| 6,051,192 A | | 4/2000 | Maston et al. ................ 429/24 |
| 6,103,411 A | * | 8/2000 | Matsubayashi et al. ....... 429/17 |
| 6,224,789 B1 | * | 5/2001 | Dybkj.ae butted.r, lb 423/648.1 X |
| 6,322,917 B1 | | 11/2001 | Acker ........................ 429/17 |

(Continued)

FOREIGN PATENT DOCUMENTS

JP    09-270265    10/1997

(Continued)

OTHER PUBLICATIONS

International Search Report Dated Apr. 21, 2003; Int'l Appl. No. PCT/US03/00428.

Primary Examiner—Stephen J. Kalafut
(74) Attorney, Agent, or Firm—Harness, Dickey & Pierce, P.L.C.

(57) ABSTRACT

A fuel processor system includes first and second reactors each having an inlet that receives fuel from a fuel supply and an outlet that discharges a reformate containing hydrogen. The reactors are operable to reform the fuel to form the reformates. The second reactor is coupled in parallel with the first reactor with the reformates produced by each combining to form a reformate flow. The first reactor can be an autothermal reforming reactor and the second reactor can be a steam reforming reactor. The first and second reactors are controlled differently to provide quick startup and transient capability while providing improved overall efficiency under normal operation.

44 Claims, 2 Drawing Sheets

U.S. PATENT DOCUMENTS

| | | |
|---|---|---|
| 6,569,552 B2 | 5/2003 | Kato et al. .................... 429/17 |
| 6,586,125 B2 | 7/2003 | Takeda et al. ................ 429/17 |
| 6,593,018 B2 | 7/2003 | Ruoff et al. .................. 429/22 |
| 6,630,109 B2 * | 10/2003 | Yamaoka et al. ....... 422/105 X |
| 2003/0134166 A1 * | 7/2003 | Skala et al. ................... 429/17 |

FOREIGN PATENT DOCUMENTS

| | | |
|---|---|---|
| JP | 11-092102 | 6/1999 |
| JP | 2000-285948 | * 10/2000 |
| JP | 2003-034504 | * 2/2003 |

* cited by examiner

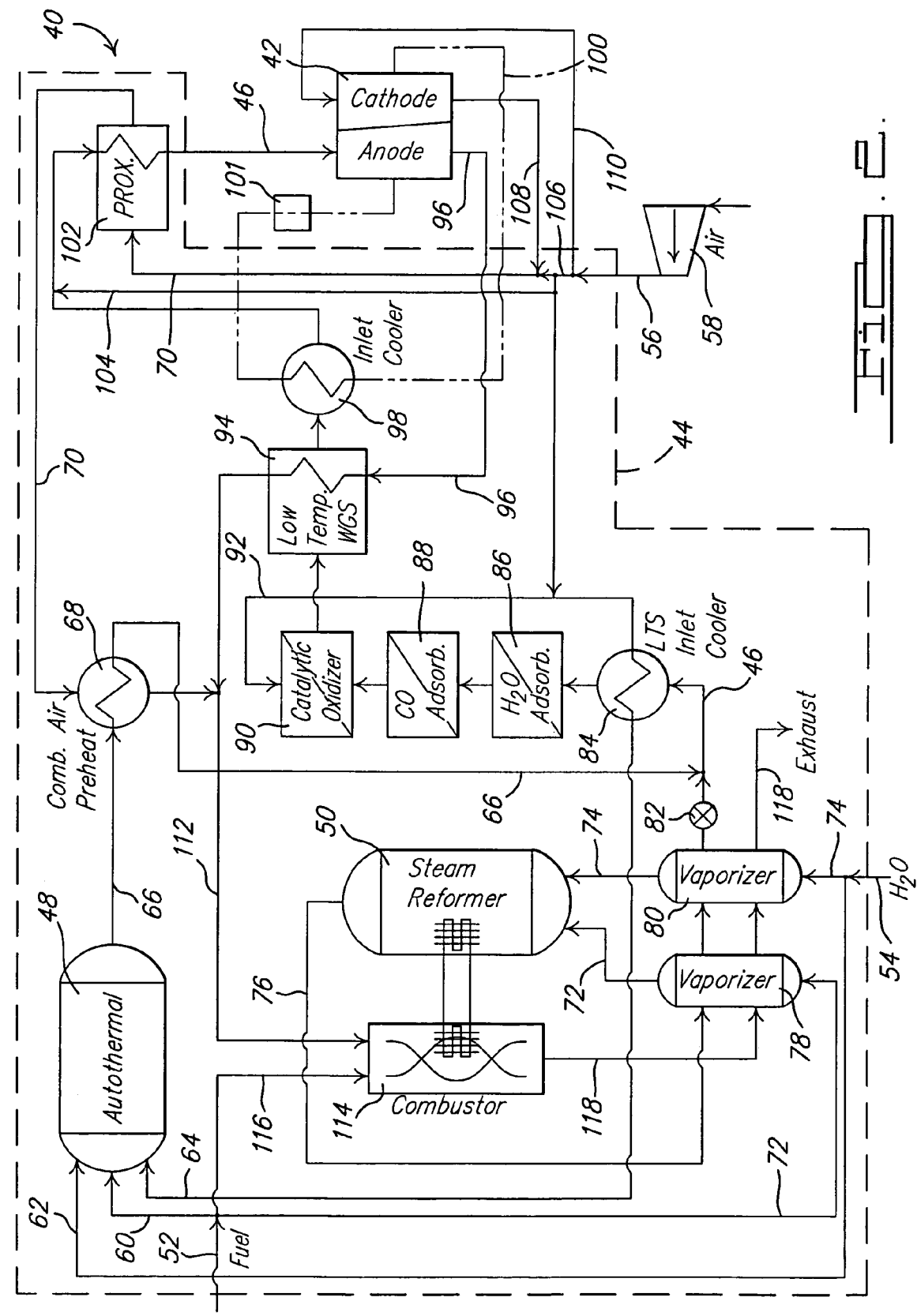

COMBINED AUTOTHERMAL/STEAM REFORMING FUEL PROCESSOR MECHANIZATION

CROSS-REFERENCE TO RELATED APPLICATIONS

This application is a continuation-in-part of U.S. patent application Ser. No. 10/044,335 filed on Jan. 11, 2002, by Glenn W. Skala, titled Dynamic Fuel Processor Mechanization and Control, now U.S. Pat. No. 6,783,879. The disclosure of the above application is incorporated herein by reference.

FIELD OF THE INVENTION

The present invention relates to fuel processors, and more particularly to fuel processors used to produce reformate containing hydrogen that can be used in fuel cells.

BACKGROUND OF THE INVENTION

Fuel cells are increasingly being used as a power source in a wide variety of different applications. Fuel cells have been proposed for use in electrical vehicle power plants to replace internal combustion engines. A solid-polymer-electrolyte membrane (PEM) fuel cell includes a membrane that is sandwiched between an anode and a cathode. To produce electricity through an electrochemical reaction, hydrogen ($H_2$) is supplied to the anode and air or oxygen ($O_2$) is supplied to the cathode.

In a first half-cell reaction, dissociation of the hydrogen ($H_2$) at the anode generates hydrogen protons ($H^+$) and electrons ($e^-$). The membrane is proton conductive and dielectric. As a result, the protons are transported through the membrane while the electrons flow through an electrical load that is connected across the electrodes. In a second half-cell reaction, oxygen ($O_2$) at the cathode reacts with protons ($H^+$) and electrons ($e^-$) to form water ($H_2O$).

The main function of a fuel processor in the fuel cell system is to provide a controlled hydrogen-containing stream to the fuel cell stack. The fuel cell stack converts the chemical energy in the hydrogen to electrical power to charge capacitors or batteries or to directly power a device such as an electric motor. In hybrid applications, a storage medium such as capacitors or batteries removes some of the problems that are associated with transient demand. For non-hybrid applications, and to a lesser extent in hybrid applications, the fuel processors need to provide a dynamic flow rate of hydrogen-containing gas to the fuel cell stack. When a device is directly powered by the fuel cell, the amount of hydrogen that is required is determined by the demand for power output from the fuel cell. For example in automotive applications, the driver demands power by depressing the accelerator pedal. Acceleration requires the electric motor to turn faster, which requires more current. When the accelerator is depressed, the fuel processor increases the hydrogen that is provided to the fuel cell. The current output by the fuel cell increases and the electric motor accelerates the vehicle.

The fuel processor produces a reformate stream that is composed primarily of hydrogen, carbon dioxide, nitrogen, water, methane and trace amounts of carbon monoxide. During operation, the fuel processor provides the flow rate of hydrogen that is required to meet the current demand for power. As can be appreciated, the demand for power can vary significantly. For example, a vehicle moving in rush hour traffic may repeatedly require sudden acceleration followed by deceleration or braking. Thus, the delivery of hydrogen to the fuel cell stack must vary accordingly. Fuel processors may also require careful metering of air and fuel to maintain precise oxygen to carbon ratio control.

Additionally, a typical fuel processor may use an autothermal reforming reactor as a primary reactor to initiate the production of the hydrogen-containing reformate stream. Autothermal reforming reactors introduce reactants (fuel, oxidants, steam, etc.) into the front of the reactor and allow the associated reactions to occur to completion as the reactants flow through the reactor. The fuel can come in a variety of forms, such as methanol, gasoline, ethanol, etc. The oxidant is typically provided in the form of oxygen ($O_2$) or air ($O_2$ mixed with $N_2$). The steam is typically superheated steam which supplies heat and water to the reactor. An autothermal reforming reactor is capable of converting the fuel into a nitrogen/steam diluted reformate stream containing hydrogen and carbon oxides that result from the combined partial oxidation reaction and steam reforming reaction, the extent of each being dependant on the operating conditions (e.g., availability of an oxidant and/or steam and temperature of the reactor). A steam reformer may also serve as the primary reactor which eliminates the nitrogen diluent that is present when partial oxidation is also included as in autothermal reforming. These two different reactions differ in their efficiencies, the operating conditions that increase and/or maximize the efficiencies, and their ability to quickly adjust to transient changes in the demand for the hydrogen-containing reformate stream. For example, the steam reforming reaction is typically more efficient at producing the hydrogen-containing reformate stream than the partial oxidation reaction. Additionally, the steam reforming reaction is more efficient at higher pressures (5-7 bars). The partial oxidation reaction is able to respond more quickly to transient changes in the demand for the hydrogen-containing reformate stream than the steam reforming reaction. Transient response requires rapid response and control in fuel, air and steam delivery, but the rates of response may vary. Furthermore, all the reactors downstream of the primary reactor must also be able to respond rapidly as well.

While the fuel cell stack can consume as much hydrogen as it needs based on the electrical load applied to the fuel cell stack, mismatching the hydrogen flow and the electrical load is problematic. An under-fueled stack may cause some of the fuel cells to temporarily have reverse polarity, which may damage the fuel cell stack. An over-fueled stack will not damage the fuel cell stack but will increase the $H_2$ exhausted. If the exhausted hydrogen is fed to a combustor, for example, increased combustion temperature may damage the combustor or cause NOx emissions to increase if additional air control is not used.

Therefore, what is needed is a fuel processor that can provide a required flow rate of hydrogen-containing reformate and respond quickly to transient changes in the demand for the hydrogen-containing reformate. Additionally, it is advantageous to provide these capabilities in an efficient manner.

SUMMARY OF THE INVENTION

A fuel processor according to the principles of the present invention is capable of providing a required flow rate of hydrogen-containing reformate. The fuel processor is also capable of responding quickly to transient changes in the demand for the hydrogen-containing reformate. Furthermore, the fuel processor incorporates two primary reactors to meet the demand for converting the fuel into the carbon oxide/hydrogen-containing reformate. The two primary reactors enable the fuel processor to meet the transient changes in the demand for the hydrogen-containing reformate while more efficiently producing the hydrogen-containing reformate during nontransient operation.

A fuel processing system according to the principles of the present invention includes a fuel supply and first and second primary reactors. The first reactor has an inlet that receives fuel from the fuel supply and an outlet that discharges a first reformate containing hydrogen and carbon oxides. The first reactor is operable to reform the fuel to form the first reformate. The second reactor also has an inlet that receives fuel from the fuel supply and an outlet that discharges a second reformate containing hydrogen and carbon oxides. The second reactor is operable to reform the fuel to form the second reformate. The second reactor is coupled in parallel with the first reactor with the first and second reformates combining to form a reformate flow which continues through additional process units to convert carbon monoxide to carbon dioxide.

In another aspect of the present invention, the fuel processor is part of a fuel cell system. The fuel cell system includes a fuel supply and an oxidant supply. There are first and second primary reactors that each have an inlet that receives fuel from the fuel supply and an outlet that discharges respective first and second reformates containing hydrogen and carbon oxides. The first and second primary reactors are operable to reform the fuel to form the respective first and second reformates. The second reactor is coupled in parallel with the first reactor with the first and second reformates combining to form a reformate flow which subsequently is fed to additional reactors such as water gas shift, preferential CO oxidizers, etc. prior to being fed to the fuel cell stack. A fuel cell stack receives an oxidant flow from the oxidant supply and the reformate flow and uses these to produce electricity.

The present invention also discloses a method of operating a fuel processing system to produce a reformate flow containing hydrogen at a predetermined rate. The method includes the steps of: (a) determining a target $H_2$ production rate; (b) producing a first reformate flow containing hydrogen at a first rate in a first primary reactor receiving fuel from a fuel supply; (c) producing a second reformate containing hydrogen at a second rate in a second primary reactor receiving fuel from the fuel supply, the second reactor operating in parallel with the first reactor; (d) combining the first and second reformate flows to form a reformate flow containing hydrogen and carbon oxides; and (e) adjusting at least one of the first and second rates so that the reformate flow is produced at the target $H_2$ production rate.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2 is a block diagram of a fuel cell system that incorporates a fuel processor according to the principles of the present invention.

DETAILED DESCRIPTION OF THE PREFERRED EMBODIMENT

The following description of the preferred embodiment is merely exemplary in nature and is in no way intended to limit the invention, its application, or uses.

Figure 1:
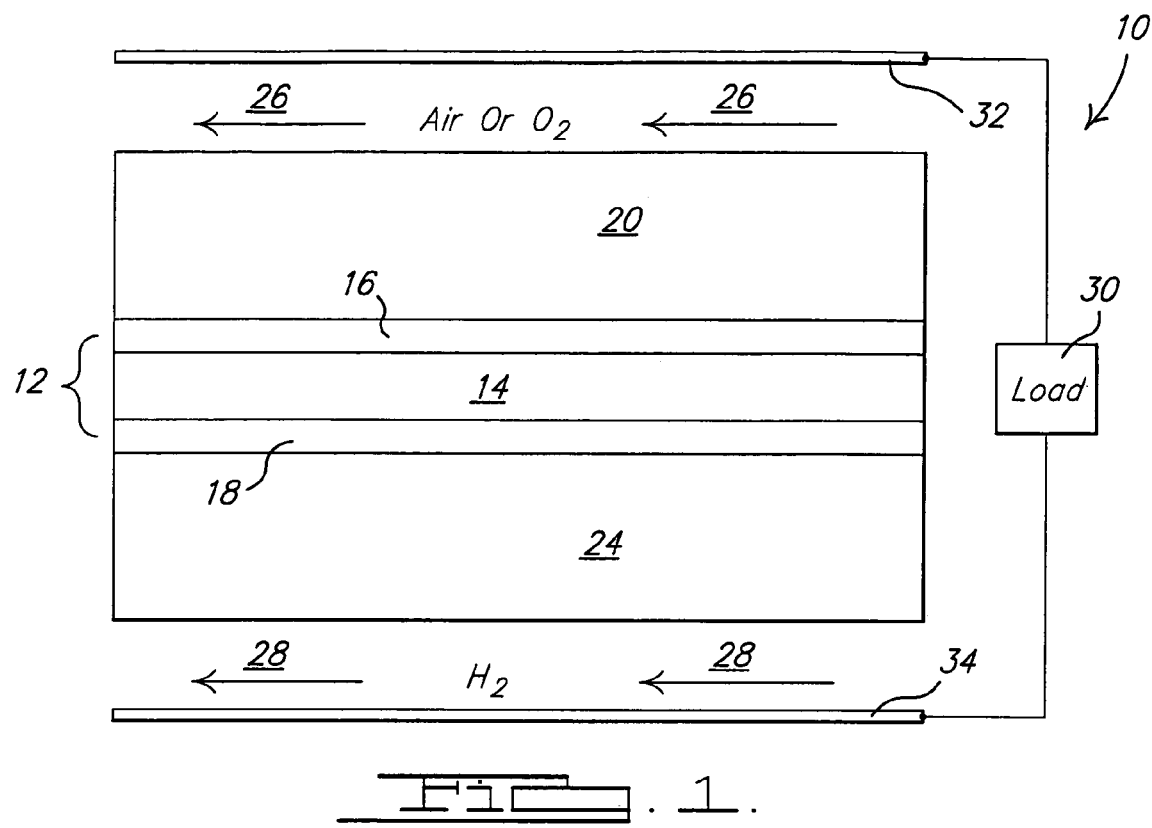
FIG. 1 illustrates a cross-section of a membrane electrode assembly (MEA) of a fuel cell.

FIG. 1 schematically illustrates a cross-section of a fuel cell assembly 10 that includes a membrane electrode assembly (MEA) 12. Preferably, the MEA 12 is a proton exchange membrane (PEM). The MEA 12 includes a membrane 14, a cathode 16, and an anode 18. The membrane 14 is sandwiched between the cathode 16 and the anode 18.

A cathode diffusion medium 20 is layered adjacent to the cathode 16 opposite the membrane 14. An anode diffusion medium 24 is layered adjacent to the anode 18 opposite the membrane 14. The fuel cell assembly 10 further includes a cathode flow channel 26 and anode flow channel 28. The cathode flow channel 26 receives and directs air or oxygen ($O_2$) from a source to the cathode diffusion medium 20. The anode flow channel 28 receives and directs hydrogen ($H_2$) from a source to the anode diffusion medium 24.

In the fuel cell assembly 10, the membrane 14 is a cation permeable, proton conductive membrane having $H^+$ ions as the mobile ion. The fuel gas is hydrogen ($H_2$) and the oxidant is oxygen or air ($O_2$). The overall cell reaction is the oxidation of hydrogen to water and the respective reactions at the anode 18 and the cathode 16 are as follows:

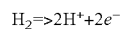

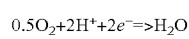

Since hydrogen is used as the fuel gas, the product of the overall cell reaction is water. Typically, the water that is produced is rejected at the cathode 16, which is a porous electrode including an electrocatalyst layer on the oxygen side. The water may be collected in a water collector (not shown) as it is formed and carried away from the MEA 12 of the fuel cell assembly 10 in any conventional manner.

The cell reaction produces a proton exchange in a direction from the anode diffusion medium 24 towards the cathode diffusion medium 20. In this manner, the fuel cell assembly 10 produces electricity. An electrical load 30 is electrically connected across a first plate 32 and a second plate 34 of the fuel cell assembly 10 to receive the electricity. The plates 32 and/or 34 are bipolar plates if a fuel cell is located adjacent to the respective plate 32 or 34 or end plates if a fuel cell is not adjacent thereto.

Referring now to FIG. 2, a block diagram of a fuel cell system 40 is illustrated. The fuel cell system 40 includes a fuel cell stack 42 that includes multiple fuel cell assemblies 10. A fuel processor 44 provides a reformate stream 46 to the anode flow channel 28. The fuel processor 44 includes a pair of primary reactors 48 and 50. The first primary reactor 48 is an autothermal reforming (ATR) reactor and the second primary reactor 50 is a steam reforming (SR) reactor. As used herein, the term "primary reactor" refers to reactors wherein the hydrocarbon fuel conversion (breakdown) takes place to provide a reformate stream. The ATR reactor 48 and the SR reactor 50 are coupled in parallel, as will be described in more detail below. The fuel processor 44 receives fuel from a fuel supply 52, water from a water supply 54, and air from an air supply 56 that may come from a variable speed compressor 58. Fuel processor 44 uses the fuel, water and air to produce reformate stream 46.

The ATR reactor 48 receives a fuel stream 60 from the fuel supply 52, a water stream 62 from the water supply 54 and an air stream 64 from the air supply 56. The fuel stream 60, water stream 62, and air stream 64 are all controlled by metering devices (not shown) so that the quantities of fuel, water and air are controlled and monitored. The ATR reactor 48 uses fuel stream 60, water stream 62 and air stream 64 to produce a first reformate stream 66 that contains hydrogen ($H_2$) as well as carbon monoxide (CO) and carbon dioxide ($CO_2$). As is known in the art, the ATR reactor 48 can produce the first reformate stream 66 with a combination of a partial oxidation reaction and a steam reforming reaction. The ATR reactor 48 operates at the same pressure as the fuel cell system 40. Preferably, the fuel cell system 40 and the ATR reactor 48 are operated at a pressure in the range of about 1.5-3.0 bars. The first reformate stream 66 exits the ATR reactor 48 and flows through a combustor air preheater 68 which extracts thermal energy from the first reformate stream 66 and uses it to heat an oxidant stream 70.

The SR reactor 50 receives a fuel stream 72 from fuel supply 52 and a water stream 74 from water supply 54. The fuel stream 72 and water stream 74 are controlled by metering devices (not shown) that allow for the fuel stream 72 and water stream 74 to be provided to the SR reactor 50 in controlled quantities. The SR reactor 50 uses the fuel stream 72 and water stream 74 to produce a second reformate stream 76 in a steam reforming reaction. The second reformate stream 76 contains $H_2$, CO and $CO_2$. To improve efficiency, the SR reactor 50 is operated at an elevated pressure relative to the fuel cell system pressure 40. Preferably, the SR reactor 50 is operated in the range of about 5.0-7.0 bars. The fuel stream 72 passes through a fuel vaporizer 78 prior to entering the SR reactor 50. The fuel vaporizer 78 vaporizes the fuel stream 72 so that it is in gaseous form when entering the SR reactor 50. The water stream 74 passes through a water vaporizer 80 prior to entering the SR reactor 50. The water vaporizer 80 heats up and vaporizes the water stream 74 so that it is in the form of steam when entering the SR reactor 50. Preferably, the water stream 74 is in the form of super heated steam when entering the SR reactor 50.

The second reformate stream 76 exits the SR reactor 50 and passes through the backside of fuel vaporizer 78 and the water vaporizer 80 wherein thermal energy is extracted from the second reformate stream 76 to help vaporize the fuel stream 72 and the water stream 74. The second reformate stream 76 then passes through a pressure let down valve 82 that lowers the pressure of the second reformate stream 76 to the fuel cell system pressure. The first and second reformate streams 66 and 76 then combine together to form reformate stream 46.

Further processing of the reformate stream 46 to reduce the CO content prior to being fed to the fuel cell stack then takes place. The reformate stream 46 passes through a low temperature shift inlet cooler 84 wherein thermal energy is extracted from the reformate flow 46 and is used to heat air stream 64 prior to entering the ATR reactor 48. In this fuel processor design, the reformate stream 46 exits the cooler 84 and passes through a water adsorber 86 wherein water is removed from or added to the reformate stream 46 depending upon the operating condition (e.g., temperature) of the fuel processor 44. The water adsorber 86 contains a desiccant (e.g., silica, zeolite). The desiccant retains water either through physisorption or chemisorption. The water adsorber 86 may be a temperature swing device that, depending upon temperature, will either adsorb water from the reformate stream 46 or release water already held to the reformate stream 46. For a discussion of water adsorbers see U.S. patent application Ser. No. 09/853,398 entitled "Rapid Startup of Fuel Processor Using Water Adsorption," which is herein incorporated by reference in its entirety.

In this fuel processor design the reformate stream 46 then flows through a CO adsorber 88. The CO adsorber 88 has a similar structure to the water adsorber 86. The CO adsorber 86 contains a metal oxide or metal salt, such as copper, silver, or tin salt or oxide impregenated or exchanged on activated carbon, alumina or zeolites, and mixtures thereof. The CO adsorber 88 is a temperature swing device that, depending upon temperature will either adsorb CO from the reformate stream 46 or release CO already held to the reformate stream 46. For a discussion of CO adsorbers see U.S. patent application Ser. No. 09/780,184 entitled "Carbon Monoxide Adsorption for Carbon Monoxide Clean-Up In A Fuel Cell System;" U.S. Pat. No. 4,917,711 issued to Xie et al.; U.S. Pat. No. 4,696,682 issued to Hirai et al.; U.S. Pat. No. 4,587,114 issued to Hirai et al.; and U.S. Pat. No. 5,529,763 issued to Peng et al., each of the disclosures of which is incorporated herein by reference in its entirety.

The reformate stream 46 then flows through a catalytic oxidizer 90. The catalytic oxidizer 90 also receives air stream 92 from air supply 56. A metering device (not shown) precisely controls the amount of air stream 92 that enters the catalytic oxidizer 90. The catalytic oxidizer 90 consumes a portion of the $H_2$ and CO contained within the reformate stream 46 to generate heat. The amount of $H_2$ consumed from the reformate stream 46 is controlled by controlling the amount of air stream 92 that enters the catalytic oxidizer 90. Since the heat generated is typically only used for start-up or when the reactor 94 is below operating temperature, the addition of air and operation of the catalyst oxidizer 90 is only applied for these requirements.

The heat generated in the catalytic oxidizer 90 is used to heat a low temperature water gas shift (WGS) reactor 94. The heat can be transferred to the WGS reactor 94 via radiation and/or reformate stream 46 which flows from the catalytic oxidizer 90 and through the WGS reactor 94. The WGS reactor 94 reduces the amount of CO in the reformate stream 46 according to the reaction $CO+H_2O \rightleftharpoons CO_2+H_2$ and in the process generates heat. The heat generated by the WGS reactor 94 is used to heat an anode effluent 96 that is exhausted by the fuel cell stack 42.

The reformate stream 46 then passes through a preferential oxidation reactor inlet cooler 98 that extracts thermal energy from reformate stream 46. A coolant stream 100 also passes through the backside of the inlet cooler 98. The inlet cooler 98 transfers the thermal energy extracted from the reformate stream 46 to the coolant stream 100. The coolant stream 100 passes through the fuel cell stack 42 and removes heat therefrom prior to passing through the inlet cooler 98. The coolant stream 100 then passes through a radiator 101 that expels heat from the coolant stream 100 to the environment.

The reformate stream 46 next passes through a preferential oxidation reaction (PROX) reactor 102. The PROX reactor 10 also receives an air stream 104 from air supply 56 that is added to the reformate stream 46. The air stream 104 is controlled by a metering device (not shown) so that precise quantities of air stream 104 are added to the PROX reactor 102. The air stream 104 and reformate stream 46 react within the PROX reactor 102 to remove CO from the reformate stream 46 in a preferential oxidation reaction. For a discussion of PROX reactors and their control see U.S. Pat. No. 5,637,415 entitled "Controlled CO Preferential Oxidation," which is herein incorporated by reference in its entirety. Oxidant stream 70 passes through the PROX reactor 102 where thermal energy is extracted from reformate stream 46 and added to oxidant stream 70 prior to oxidant stream 70 passing through the combustor air preheater 68. Air stream 106 from air supply 56 is combined with a cathode effluent 108 exhausted from the fuel cell stack 42 to form the oxidant stream 70.

The reformate stream 46 then enters the anode flow channels 28 of the fuel cell stack 42. Air stream 110 from air supply 56 passes through the cathode flow channels 26 of the fuel cell stack 42. The air stream 110 and the reformate stream 46 are reacted within the fuel cell stack 42 to produce electricity, cathode effluent 108 and anode effluent 96. The anode effluent 96 contains unreacted $H_2$ that is used in the fuel processor 44. Anode effluent 96 exits the fuel cell stack 42 and passes through the WGS reactor 94 wherein thermal energy is transferred from WGS reactor 94 and/or reformate stream 46 to anode effluent 96. The cathode effluent 108 contains unused oxidant that is also used in the fuel processor 44. Cathode effluent 108, as was stated above, combines with air stream 106 to form oxidant stream 70. Oxidant stream 70 after passing through the combustor air preheater 68 combines with the anode effluent 96 to form effluent stream 112.

Effluent stream 112 flows through a combustor 114. Fuel stream 116 from fuel supply 52 flows into combustor 114. The fuel stream 116 is controlled by a metering device (not shown) that accurately meters the amount of fuel stream 116 that enters combustor 114. Combustor 114 combusts effluent stream 112 and/or the fuel stream 116 to produce thermal energy that is used to heat a catalyst bed (not shown) within the SR reactor 50. The combustor 114 can catalytically combust and/or thermally combust effluent stream 112 and fuel stream 116. The combustor 114 produces a hot exhaust stream 118 that passes through the backside of fuel vaporizer 78 and the water vaporizer 80 prior to being exhausted to the environment. The hot exhaust stream 118 is used to help vaporize the fuel stream 72 flowing through fuel vaporizer 78 and water stream 74 flowing through water vaporizer 80.

In addition to the above-described components of the fuel processor 44, various water collectors can be incorporated into the fuel processor 44 and/or fuel cell system 40 to provide a source of water to supplement and/or be the water supply 54 as will be apparent to those skilled in the art. For example, a water collector (not shown) can be positioned between the PROX reactor 102 and the fuel cell stack 42 such that the reformate stream 46 flows through the water collector prior to entering the fuel cell stack 42. Water can then be collected from the reformate stream 46. Additionally, a water collector (not shown) can be positioned downstream of the fuel cell stack 42 such that the cathode effluent passes through the water collector prior to forming oxidant stream 70. Water can then be collected from the cathode effluent 108. Furthermore, a water collector can also be positioned in the exhaust stream 118 downstream of the gas and water vaporizer 78 and 80. Water can then be collected from the exhaust stream 118.

The operation of the fuel processor 44 will vary depending upon the operating state of the fuel processor 44. For example, the fuel processor 44 will operate differently during a cold startup then during a normal run mode. Additionally, fuel processor 44 will operate differently during transient changes in a demand for $H_2$ within reformate stream 46. Furthermore, transient operation of the fuel processor 44 will also vary depending upon whether there is an upswing or downswing transient response in the need for $H_2$ in reformate stream 46. The mechanization of the fuel processor 44 allows for partial oxidation or autothermal reforming within the ATR reactor 48 during cold startup, with transition to pure high pressure steam reforming in the SR reactor 50 during normal run mode, if desired, and the potential for transient supplementation by the ATR reactor 48 if the SR reactor 50 pressure is inadequate due to response time, duration or steam reforming thermal balance. This aspect of the present invention will be more fully appreciated with a description of the operating process.

During a cold startup of the fuel processor 44, the temperatures of the various components will not be at their normal operating temperatures and will have limited functionality. For example, the SR reactor 50, when below operating temperature, may not be able to produce the second reformate stream 76. Additionally, water may also not be available during the cold startup depending upon the design and configuration of the fuel processor 44 and/or the fuel cell system 40. During a cold startup, the ATR reactor 48 is provided with fuel stream 60 and air stream 64 and fuel conversion is initiated as a partial oxidation reactor. The fuel stream 60 and air stream 64 are metered so that an oxygen to carbon ratio within the ATR reactor 48 is equal to or greater than 1.0. The ATR reactor 48 then produces hot $H_2$-containing first reformate stream 66 via the partial oxidation reaction. The startup partial oxidation can be thermal or electrically supplemented catalytic partial oxidation. First reformate stream 66 then passes through the combustion air preheater 68 to preheat oxidant stream 70 prior to combining with the anode effluent 96 and entering the combustor 114. The SR reactor 50 is not operated during the cold startup due to the SR reactor 50 being below operating temperature and incapable of producing a $H_2$-containing second reformate stream 76. Because the SR reactor 50 is not producing second reformate stream 76, the first reformate stream 66 is the reformate stream 46. Reformate stream 46 then passes through the low temperature shift inlet cooler 84 to extract heat from reformate stream 46 and heat air stream 64 prior to entering ATR reactor 48.

Reformate stream 46 then passes through water adsorber 86 which, due to being below its normal operating temperature, adsorbs water from the first reformate stream 46. The water adsorber 86 will continue to adsorb water from the reformate stream 46 until the WGS reactor 94 and the water adsorber 86 are up to operating temperature. The use of water adsorber 86 allows for a cold dry reformate 46 to pass into downstream reactors without having condensation problems on the catalysts within those downstream reactors. Reformate stream 46 then passes through the CO adsorber 88 which, due to being below its normal operating temperature, adsorbs CO from the first reformate stream 66. The CO adsorber 88 continues to extract CO from the reformate stream 46 until the WGS reactor 94 and the CO adsorber 88 are at their normal operational temperature. The use of the CO adsorber 88 provides a means to supply $H_2$ to the fuel cell stack 42 before the low temperature WGS reactor 94 is at its normal operating temperature.

The reformate stream 46 then passes through the catalytic oxidizer 90 which, during the cold startup, is used to heat WGS reactor 94. Specifically, air stream 92 is added to the catalytic oxidizer 90 in a controlled amount so that a portion of the reformate stream 46 is combusted and generates thermal energy that heats the WGS reactor 94. The catalytic oxidizer 90 is operated until the WGS reactor 94 reaches its start-up temperature. The use of the catalytic oxidizer 90 provides a means to oxidize a portion of the reformate stream 46 to supply heat to the downstream WGS reactor 94 to bring it to start-up/normal operation as soon as possible.

The reformate stream 46 then passes through the WGS reactor 94 which is inactive until it reaches its start-up/normal operational temperature. Reformate stream 46 then passes through the inlet cooler 98. Air stream 104 is added to the reformate stream 46, prior to entering the PROX reactor 102, in a controlled quantity so that the air stream 104 oxidizes a portion of the reformate stream 46 in the PROX reactor 102. The oxidizing of a portion of reformate stream 46 generates thermal energy that heats the PROX reactor 102 up to normal operating temperature.

The reformate stream 46 then enters the fuel cell stack 42 along with air stream 110 wherein electricity is produced along with anode and cathode effluents 96 and 108. The anode effluent 96 passes through the WGS reactor 94 wherein, depending upon the temperature of the WGS reactor 94, thermal energy is added to or removed from the WGS reactor 94 and transferred from/added to the anode effluent 96. Concurrently, cathode effluent 108 is added to air flow 106 to form oxidant flow 70 that passes through the PROX reactor 102 wherein, depending upon the temperature of the PROX reactor 102 and of the oxidant stream 70, heat transfer will also occur between the oxidant stream 70 and the PROX reactor 102. The oxidant stream 70 then passes through the combustion air preheater 68 wherein thermal energy from the first reformate stream 66 is transferred to the oxidant stream 70. The oxidant stream 70 and anode effluent 96 then combine to form effluent stream 112 that is supplied to the combustor 114.

Concurrently to producing first reformate stream 66 in the ATR reactor 48 via partial oxidation reactions, combustor 114 is supplied with fuel stream 116 and, when available, effluent stream 112 which are combusted, either thermally or catalytically, to heat the SR reactor 50. Additionally, the hot exhaust stream 118 exiting the combustor 114 passes through fuel vaporizer 78 and water vaporizer 80 to assist in vaporizing the respective fuel and water streams 72 and 74 entering SR reactor 50.

Thus, during a cold startup all of the reformate stream 46 is initially provided by the ATR reactor 48 in the form of first reformate stream 66. As the various components of the fuel processor 44 reach their operational temperatures, the SR reactor 50 begins to operate in a parallel fashion with the ATR reactor 48 to produce second reformate stream 76. Additionally, as the ATR reactor 48 increases in temperature and steam becomes available, the ATR reactor 48 will shift from a partial oxidation reaction to a combination partial oxidation and steam reforming reactions to produce first reformate stream 66. In the transition from the startup mode to the normal run mode, the water and CO adsorbers 86 and 88 function to desorb water vapor and CO from the reformate stream 46. Under normal run mode operation, the adsorption processes would not perform any function as mechanized and the now operational WGS reactor 94 and PROX reactor 102 operate to remove CO from reformate stream 46, as will be described below.

When the fuel processor 44 is at its normal operational temperature, both the ATR reactor 48 and the SR reactor 50 are operated in a parallel fashion wherein both reactors 48 and 50 produce $H_2$-containing reformates that form the reformate stream 46. Specifically, the ATR reactor 48 will operate at the system pressure (in the range of about 1.5-3.0 bars) and will receive fuel and air streams 60 and 64, as previously discussed, along with receiving water stream 62 which may already be in the form of steam or will be heated within the ATR 48 to form steam so that the ATR reactor 48 produces first reformate stream 66 through a combination of partial oxidation reaction and steam reforming reaction.

Concurrently, the SR reactor 50 will receive a vaporized fuel stream 72 and the vaporized water stream 74 in the form of steam which together undergo a steam reforming reaction within the SR reactor 50 to produce hot $H_2$-containing second reformate stream 76. The SR reactor 50 is operated at an elevated pressure (in the range of about 5.0-7.0 bars) relative to the system pressure. The second reformate stream 76 passes through the fuel and water vaporizers 78 and 80 wherein thermal energy is extracted from the second reformate stream 76 and used to assist in vaporizing fuel stream 72 and water stream 74. The second reformate stream 76 then passes through the pressure let down valve 82 to drop to the system pressure and combine with first reformate stream 66 and form the reformate stream 46.

The reformate stream 46 then passes through the low temperature shift inlet cooler 84 wherein thermal energy is extracted from reformate stream 46 and added to air stream 64 supplied to ATR reactor 48. The reformate stream 46 then passes through the water adsorber 86 and CO adsorber 88. The water adsorber 86 and CO adsorber 88, being at their operational temperature no longer adsorb water or CO from the reformate stream 46. Depending upon the equilibrium points and temperature, the water adsorber 86 and/or the CO adsorber 88 may desorb water and/or CO which would be added to reformate stream 46.

The reformate stream 46 then passes through catalytic oxidizer 90 which no longer receives air stream 92 and is inactive. The reformate stream 46 then passes through WGS reactor 94 wherein CO is converted via the water gas shift reaction to $CO_2$. Reformate stream 46 then passes through inlet cooler 98 and PROX reactor 102 wherein the reformate stream 46 is further conditioned to convert remaining CO to $CO_2$ and provide stack grade quality reformate to the fuel cell stack 42. The reformate stream 46 then flows into fuel cell stack 42 out of which electricity and anode and cathode effluents 96 and 108 flow. The anode and cathode effluents 96 and 108 then follow the same process as was discussed above. The amount of air supplied to the oxidant stream 70 via air stream 106 will vary depending upon the needs of the combustor 114 for oxidants in addition to that contained within cathode effluent 108.

During transient changes in the demand for $H_2$ by the fuel cell stack 42, the operation of the fuel processor 44 will change. The transient change can be an upswing transient wherein additional $H_2$ is demanded by the fuel cell stack 42 or a downswing transient wherein less $H_2$ is required by the fuel cell stack 42. The upswing and downswing transients are met by the fuel processor 44 in different ways.

ATR reactor 48, and particularly the partial oxidation reaction, is able to more quickly increase $H_2$ production than SR reactor 50. Therefore, during an upswing transient ATR reactor 48 is operated to quickly provide the additional $H_2$ required by the fuel cell stack 42 while relying on indirect heat transfer to gradually ramp up the SR reactor 50 to produce the required additional $H_2$. The rate at which the SR reactor 50 can produce the additional required $H_2$ will vary depending upon the operational pressure of the SR reactor 50 and the heat transfer limitations associated with the design of the fuel processor 44.

Therefore, during an upswing transient, fuel stream 62 and air stream 64 flowing into ATR reactor 48 are increased so that additional partial oxidation reaction can occur and the additional $H_2$ demanded by the fuel stack 42 can be met.

The SR reactor 50 can be operated so that it continues to produce the same amount of $H_2$ within second reformate stream 76 as it does during the normal operational mode or, alternatively, can be operated to increase the amount of $H_2$ provided via the second reformate stream 76 as the SR reactor 50 is provided with the additional heat required to produce the additional $H_2$. If the transient upswing is temporary, the fuel processor 44 can be operated so that the entire transient upswing is provided by the ATR reactor 48. If the transient upswing is a step change in the $H_2$ requirement of the fuel cell stack 42, the ATR reactor 48 can be operated to quickly provide the needed additional $H_2$ while the output of the SR reactor 50 is also increased. As the output of the SR reactor 50 increases, the output of the ATR reactor 48 can be decreased so that a balance between the amount of $H_2$ provided by first reformate stream 66 and second reformate stream 76 are a desired ratio. Because SR reactor 50 is more efficient, balancing the amount of $H_2$ provided by the first and second reformate streams 66 and 76 can yield the highest overall fuel processor efficiency.

During a downswing transient, the second reformate stream 76 and/or SR reactor 50 can be restricted so that less $H_2$ is provided to reformate stream 46 via the second reformate stream 76 to quickly decrease the amount of $H_2$ provided to fuel cell stack 42. The output and operational conditions of ATR reactor 48 and SR reactor 50 are then adjusted so that less $H_2$ is produced overall via the first and second reformate stream 66 and 76 and each reactor produces a desired proportion of the $H_2$ in the reformate stream 46.

The above described invention combines multiple processes into one fuel processor mechanization which is capable of producing a hydrogen-reformate quickly by use of a thermal or electric catalyst for start-up. The ATR reactor 48 operates in a partial oxidation mode during startup and upswing transients and is capable of producing a hydrogen reformate before the complete reactor volume reaches its operation equilibrium temperatures. The parallel SR reactor 50 requires a longer period of time for the associated catalyst within the SR reactor 50 to reach the required activation temperature.

Figure 3:
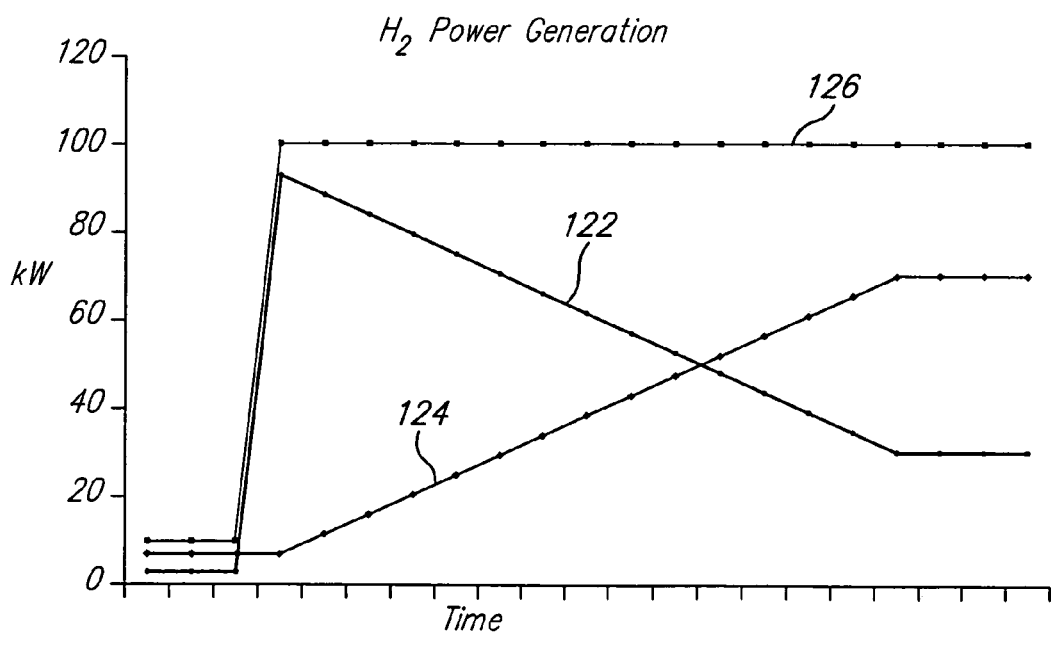
FIG. 3 is a graphical representation of an exemplary transient change in $H_2$ production.

As stated above, under startup and transient upswings, ATR reactor 50 is used to supply the $H_2$ and/or additional $H_2$ respectively, that is required by the fuel cell stack 42. Under normal operation, the SR reactor 50 provides a majority of the total $H_2$ required by the fuel cell stack 42 with the ATR reactor 48 in an idle or reduced operating mode. For example, during normal operation run mode, the SR reactor 50 can be operated to supply approximately 70% of the $H_2$ required by the fuel cell stack 42 while the ATR reactor 48 is operated to provide approximately 30% of the $H_2$ required by the fuel cell stack 42. This mechanization supports transients with the ATR reactor 48 and quasi steady state operation using the SR reactor 50. An example of transient operation is illustrated in FIG. 3 in which the $H_2$ generation of ATR reactor 48 is shown by curve 122, the $H_2$ generation of SR reactor 50 is shown by curve 124, and the total $H_2$ demand of the fuel cell stack 42 is shown by curve 126. The transient operation example is as follows. If the fuel processor 44 is at a total $H_2$ generation of 10 kW (ATR reactor 48 at 3 kW and the SR reactor 50 at 7 kW), and would like to increase the power to 100 kW then ATR reactor 48 would be initially commanded to produce 93 kW. The SR reactor 50 would also perform a transient change but at a slower rate. As the $H_2$ generation of SR reactor 50 increases, the output of ATR reactor 48 is reduced until reaching a desired system balance set point. The end result would be the ATR reactor 48 at 30 kW and the SR reactor 50 at 70 kW. While this transient example is graphically represented in FIG. 3, it should be understood that the changes in $H_2$ production are shown as being linear for exemplary purposes only. The actual changes in $H_2$ production do not need to be linear or at the rates shown to be within the scope of the present invention.

This mechanization of having an ATR reactor 48 and a SR reactor 50 in parallel takes advantage of positive aspects of each by combining their attributes in a modular parallel reacting system. The ATR reactor 48 allows for quick partial oxidation startups and quick transients by not relying on heat transfer (to support steam reforming and vaporization) to perform transients. The ATR reactor 48 during normal operation or startup partial oxidation is less efficient than the SR reactor 50. The SR reactor 50 provides an efficient hydrocarbon conversion process but may be limited in transient performance. The SR reactor 50 performs load follow (transient changes) at a slower rate than the ATR reactor 48 and does not include a quick start mechanism. Transient performance improvements are possible in the SR reactor 50 when operated at elevated pressures by allowing a pressure decay to perform transients. Therefore, depending upon the desired operational conditions of the fuel cell system 40 and/or the fuel processor 44, the ATR reactor 48 and SR reactor 50 are operated in a parallel fashion with each providing various amounts of $H_2$. The use of these modular or parallel reactors can provide for quick startup and transient capability through the ATR reactor 48 and improved overall efficiency through the use of SR reactor 50 under normal operation. During the transient conditions, the ATR reactor 48 and SR reactor 50 can be increased and/or decreased to achieve the desired operational $H_2$ output while providing the highest overall fuel processor efficiency.

Those skilled in the art can now appreciate from the foregoing description that the broad teachings of the present invention can be implemented in a variety of forms. Therefore, while this invention has been described in connection with particular examples therefore, the true scope of the invention should not be so limited since other modifications will become apparent to the skilled practitioner upon a study of the drawings, the specification and the following claims.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel processing system comprising:
   a fuel supply;
   a first reactor having an inlet receiving fuel from said fuel supply and an outlet discharging a first reformate containing hydrogen, said first reactor operable to reform said fuel to form said first reformate;
   a second reactor having an inlet receiving fuel from said fuel supply and an outlet discharging a second reformate containing hydrogen, said second reactor operable to reform said fuel to form said second reformate, and said second reactor being coupled in parallel with said first reactor with said first and second reformates combining to form a reformate flow; and
   a catalytic oxidizer reacting a portion of said reformate flow to heat a downstream reactor;
   wherein said first reactor is an autothermal reforming reactor and said second reactor is a steam reforming reactor and said first and second reactors operate at different pressures.

2. The fuel processing system of claim 1, wherein thermal energy is extracted from said first reformate and used as a heat input for said second reactor.

3. The fuel processing system of claim 1, wherein thermal energy is extracted from said first reformate and used to vaporize a feed stream supplied to said second reactor.

4. The fuel processing system of claim 1, wherein thermal energy is extracted from at least one of said first and second reformates to heat an oxidant supplied to said first reactor.

5. The fuel processing system of claim 1, wherein said first reactor has a first transient response time and said second reactor has a second transient response time that is greater than said first transient response time.

6. The fuel processing system of claim 1, wherein said first reactor has a first response time and a first hydrogen reformate capacity and said second reactor has a second response time and a second hydrogen reformate capacity and said first and second response times and hydrogen reformate capacities provide adequate hydrogen to a fuel cell stack operation over all transients and ranges of said fuel cell stack operation.

7. A fuel cell system comprising:
a fuel supply;
an oxidant supply;
a first reactor having an inlet receiving fuel from said fuel supply and an outlet discharging a first reformate containing hydrogen, said first reactor operable to reform said fuel to form said first reformate;
a second reactor having an inlet receiving fuel from said fuel supply and an outlet discharging a second reformate containing hydrogen, said second reactor operable to reform said fuel to form said second reformate, and said second reactor being coupled in parallel with said first reactor with said first and second reformates combining to form a reformate flow downstream of said second reactor without said first reformate flowing through said second reactor; and
a fuel cell stack receiving an oxidant flow from said oxidant supply and said reformate flow, said fuel cell stack producing electricity from said oxidant and reformate flows.

8. The fuel cell system of claim 7, wherein said first reactor is a partial oxidation reactor and said second reactor is a steam reforming reactor.

9. The fuel cell system of claim 8, wherein said first reactor is an autothermal reformer.

10. The fuel cell system of claim 8, wherein said first reactor is an autothermal reformer which can operate as a partial oxidation reactor or autothermal reformer.

11. The fuel cell system of claim 7, wherein said first and second reactors operate at different pressures.

12. The fuel cell system of claim 7, further comprising a catalytic oxidizer reacting a portion of said reformate flow to heat a downstream reactor.

13. The fuel cell system of claim 7, further comprising a preferential oxidation reactor reacting a portion of said reformate flow and generating heat.

14. The fuel cell system of claim 7, wherein thermal energy is extracted from said first reformate and used to heat a downstream reactor.

15. The fuel cell system of claim 7, wherein thermal energy is extracted from said first reformate and used to vaporize a feed stream supplied to said second reactor.

16. The fuel cell system of claim 7, wherein thermal energy is extracted from at least one of said first and second reformates to heat an oxidant supplied to said first reactor.

17. The fuel cell system of claim 7, wherein said first reactor has a first transient response time and said second reactor has a second transient response time that is greater than said first transient response time.

18. A fuel processor comprising:
a fuel supply;
an autothermal reactor having an inlet receiving fuel from said fuel supply and an outlet discharging a first reformate containing hydrogen, said autothermal reactor operable to reform said fuel to form said first reformate; and
a steam reforming reactor having an inlet receiving fuel from said fuel supply and an outlet discharging a second reformate containing hydrogen, said steam reforming reactor operable to reform said fuel to form said second reformate, and said steam reforming reactor being coupled in parallel with said autothermal reactor with said first and second reformates combining to form a reformate flows,
wherein said autothermal reactor has a first transient response time and said steam reforming reactor has a second transient response time that is greater than said first transient response time.

19. The fuel processing system of claim 18, wherein thermal energy is extracted from said first reformate and used to heat said steam reforming reactor without flowing through said steam reforming reactor.

20. The fuel processing system of claim 19, further comprising a combustor that reacts a combustor oxidant flow heated with said thermal energy extracted from said first reformate and a fuel flow to heat said steam reforming reactor.

21. The fuel processing system of claim 18, wherein said autothermal reactor operates at a lower pressure than said steam reforming reactor.

22. The fuel processing system of claim 18, wherein thermal energy is extracted from said first reformate and used to vaporize a feed stream supplied to said steam reforming reactor.

23. The fuel processing system of claim 18, wherein thermal energy is extracted from at least one of said first and second reformates and used to heat an oxidant supplied to said autothermal reactor.

24. The fuel processing system of claim 18, further comprising a catalytic oxidizer reacting a portion of said reformate flow to heat a downstream reactor.

25. A method of operating a fuel processing system to produce a reformate flow containing hydrogen at a predetermined rate, the method comprising the steps of:
(a) determining a target $H_2$ production rate;
(b) producing a first reformate flow containing hydrogen at a first rate in a first reactor receiving fuel from a fuel supply, said first reactor being an autothermal reactor and produces said first reformate in at least one of a partial oxidation reaction and a steam reforming reaction in said autothermal reforming reactor;
(c) producing a second reformate containing hydrogen at a second rate in a second reactor receiving fuel from said fuel supply, said second reactor operating in parallel with said first reactor, said second reactor being a steam reforming reactor and produces said second reformate in a steam reforming reaction;
(d) combining said first and second reformate flows to form a third reformate flow containing hydrogen; and
(e) adjusting at least one of said first and second rates so that said reformate flow is produced at said target $H_2$ production rates, wherein during a cold start-up of the fuel processing system step (b) includes producing at least a portion of said first reformate flow in a partial oxidation reaction and step (e) includes adjusting at least one of said first and second rates so that all of said third reformate flow is provided by said first reformate flow.

26. The method of claim 25, wherein step (b) further comprises producing all of said first reformate flow in an autothermal reforming reaction in said first reactor.

27. The method of claim 25, wherein step (b) further comprises producing at least a portion of said first reformate flow in a partial oxidation reaction in said first reactor.

28. The method of claim 25, wherein step (b) further comprises producing at least a portion of said first reformate flow in a steam reforming reaction in said first reactor.

29. The method of claim 28, wherein step (e) further comprises adjusting at least one of said first and second rates so that a majority of said third reformate flow is provided by said second reformate flow during nominal operation of the fuel processing system.

30. The method of claim 28, further comprising the step of removing CO from said reformate flow in a low temperature shift reactor.

31. The method of claim 25, wherein said partial oxidation reaction occurs at an oxygen to carbon ratio of at least 1.0.

32. The method of claim 25, further including the steps of:
(f) removing $H_2O$ from said third reformate flow in an $H_2O$ adsorber; and
(g) removing CO from said third reformate flow in a CO adsorber.

33. The method of claim 32, further comprising the steps of:
(h) releasing adsorbed $H_2O$ from said $H_2O$ adsorber into said third reformate flow as said $H_2O$ adsorbent is heated beyond an $H_2O$ adsorbent retention temperature; and
(i) releasing adsorbed CO from said CO adsorber into said third reformate flow as said CO adsorbent is heated beyond a CO adsorbent retention temperature.

34. The method of claim 25, wherein step (e) includes adjusting said first rate so that said first reformate provides a majority of an upward transient change in said target $H_2$ production rate during an upward transient operation of the fuel processing system.

35. The method of claim 34, wherein step (b) further comprises producing a change in said first rate by increasing a portion of said first reformate produced in a partial oxidation reaction.

36. The method of claim 25, wherein said step (e) further comprises adjusting said second rate so that said second reformate provides a majority of a downward transient change in said target $H_2$ production rate during a downward transient operation of the fuel processing system.

37. The method of claim 36, wherein step (e) further comprises restricting said second reformate and increasing pressure in said second reactor.

38. The method of claim 25, wherein step (b) includes producing said first reformate in a partial oxidation reaction in said first reactor and step (c) includes producing said second reformate in a steam reforming reaction in said second reactor.

39. The method of claim 25, wherein step (b) is performed at a first pressure and step (c) is performed at a second pressure different from said first pressure.

40. The method of claim 25, further comprising the steps of:
(f) extracting thermal energy from said first reformate; and
(g) using said extracted thermal energy to heat said second reactor.

41. The method of claim 25, further comprising the steps of:
(f) extracting thermal energy from said first reformate; and
(g) using said extracted thermal energy to vaporize a feed stream to said second reactor.

42. The method of claim 25, further comprising the steps of:
(f) extracting thermal energy from at least one of said first and second reformates; and
(g) heating an oxidant flow supplied to said first reactor with said extracted thermal energy.

43. The method of claim 25, further comprising the steps of:
(f) reacting a portion of said third reformate flow in a catalytic oxidizer to produce thermal energy; and
(g) heating a downstream reactor with said thermal energy produced by said catalytic oxidizer.

44. The method of claim 25, wherein said first reactor has a first transient response time and said second reactor has a second transient response time that is greater than said first transient response time.

* * * * *